United States Patent

[11] 3,602,196

| [72] | Inventor | Julius C. Tucci |
| | | 181 W. 2nd St., Weston, W. Va. 26452 |
| [21] | Appl. No. | 876,800 |
| [22] | Filed | Nov. 14, 1969 |
| [45] | Patented | Aug. 31, 1971 |

[54] COLLAPSIBLE COMBINATION BIRD SHELTER AND FEEDER
16 Claims, 33 Drawing Figs.

[52] U.S. Cl. .................................................. 119/23,
43/131, 119/51, 206/47, 222/457, 229/17
[51] Int. Cl. ...................................................... A01k 31/00
[50] Field of Search .......................................... 119/23, 51,
52; 222/457, 59, 60; 229/7, 17, 16; 43/131; 206/47

[56] References Cited
UNITED STATES PATENTS

| 2,190,721 | 2/1940 | Mallgraf................. | 119/23 |
| 2,424,733 | 7/1947 | Benson..................... | 119/23 |
| 2,556,707 | 6/1951 | Rendall et al............. | 229/7 |
| 2,650,451 | 9/1953 | Karstedt................... | 43/131 |
| 3,425,602 | 2/1969 | Tucci....................... | 222/457 |

*Primary Examiner*—Aldrich F. Medbery
*Attorney*—Berman, Davidson and Berman

ABSTRACT: A combination bird shelter and housing or feeding station formed from one or more blanks formed from a sheet or sheets of cardboard, plastic or the like, cut and scored to fold into a roofed shelter surrounding and supporting a feeder station or bird house, a prime characteristic with the structure being that it may be assembled from the flat by interengaging tongues and slots without any requirement for stapling or adhesive.

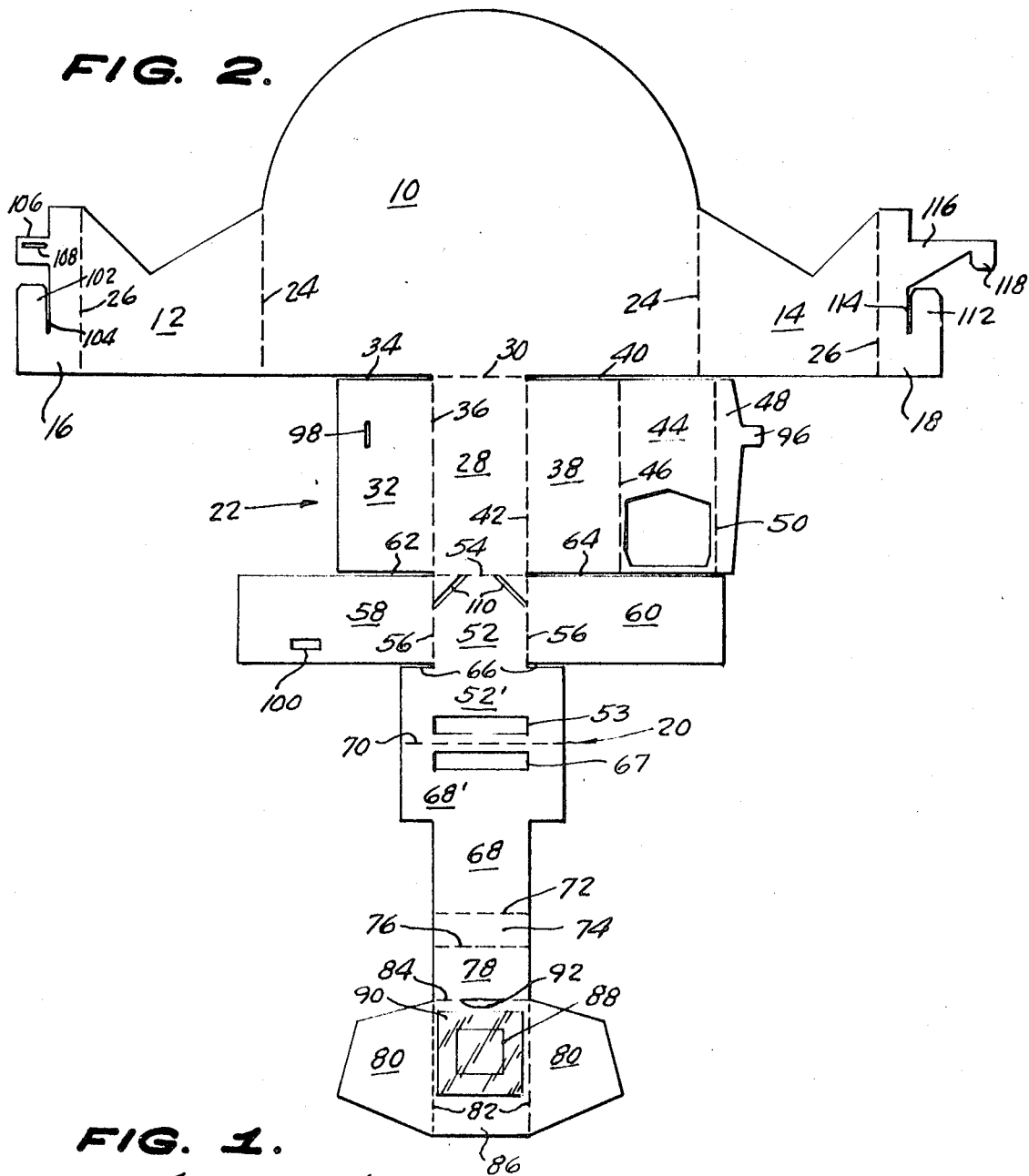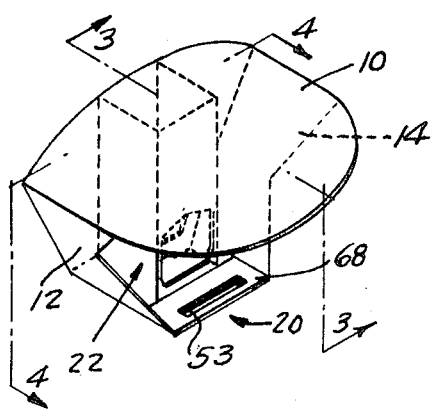

INVENTOR.
JULIUS C. TUCCI,
BY
Berman, Davidson & Berman,
ATTORNEYS.

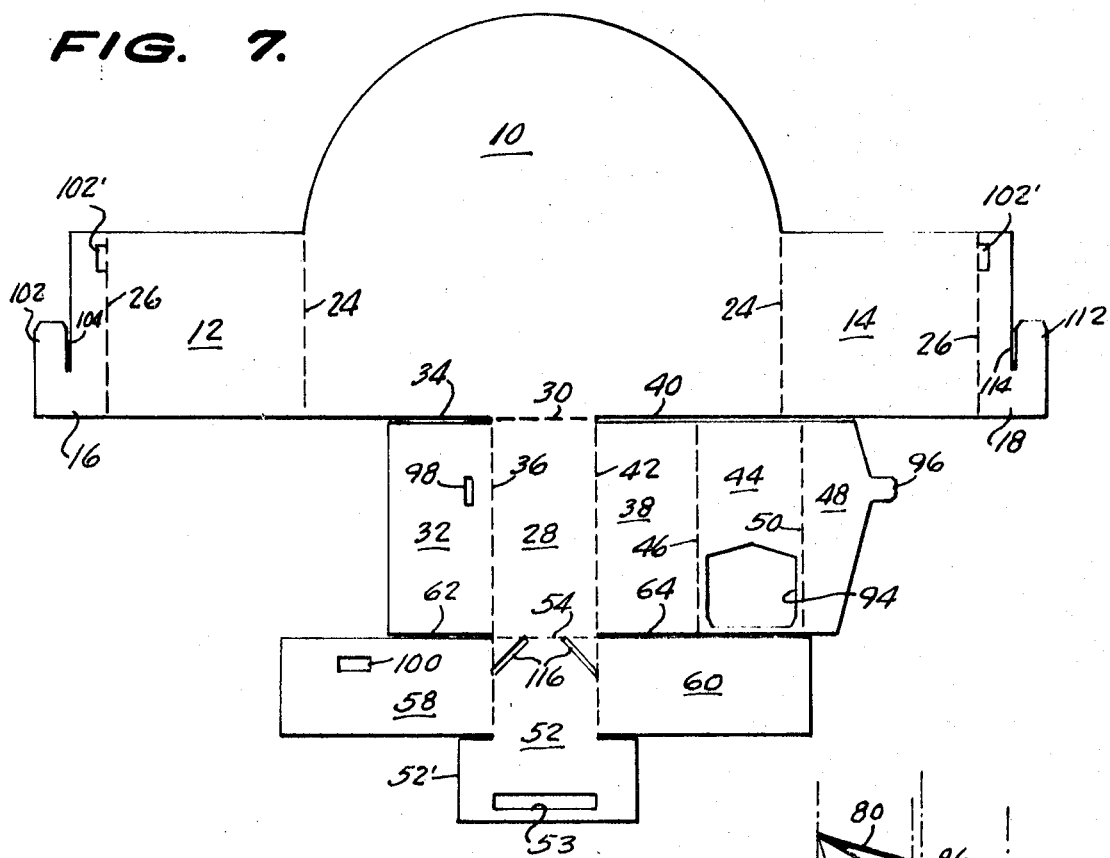
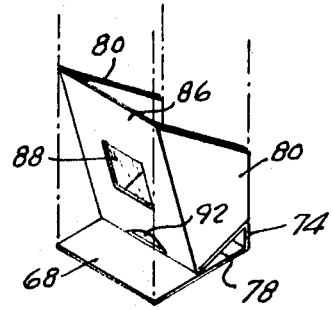
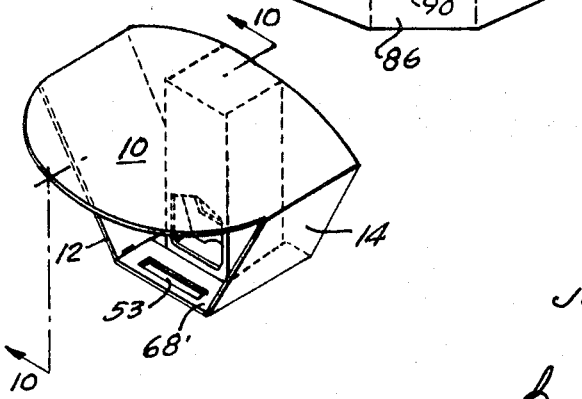

INVENTOR.
JULIUS C. TUCCI,
BY
Berman, Davidson & Berman,
ATTORNEYS.

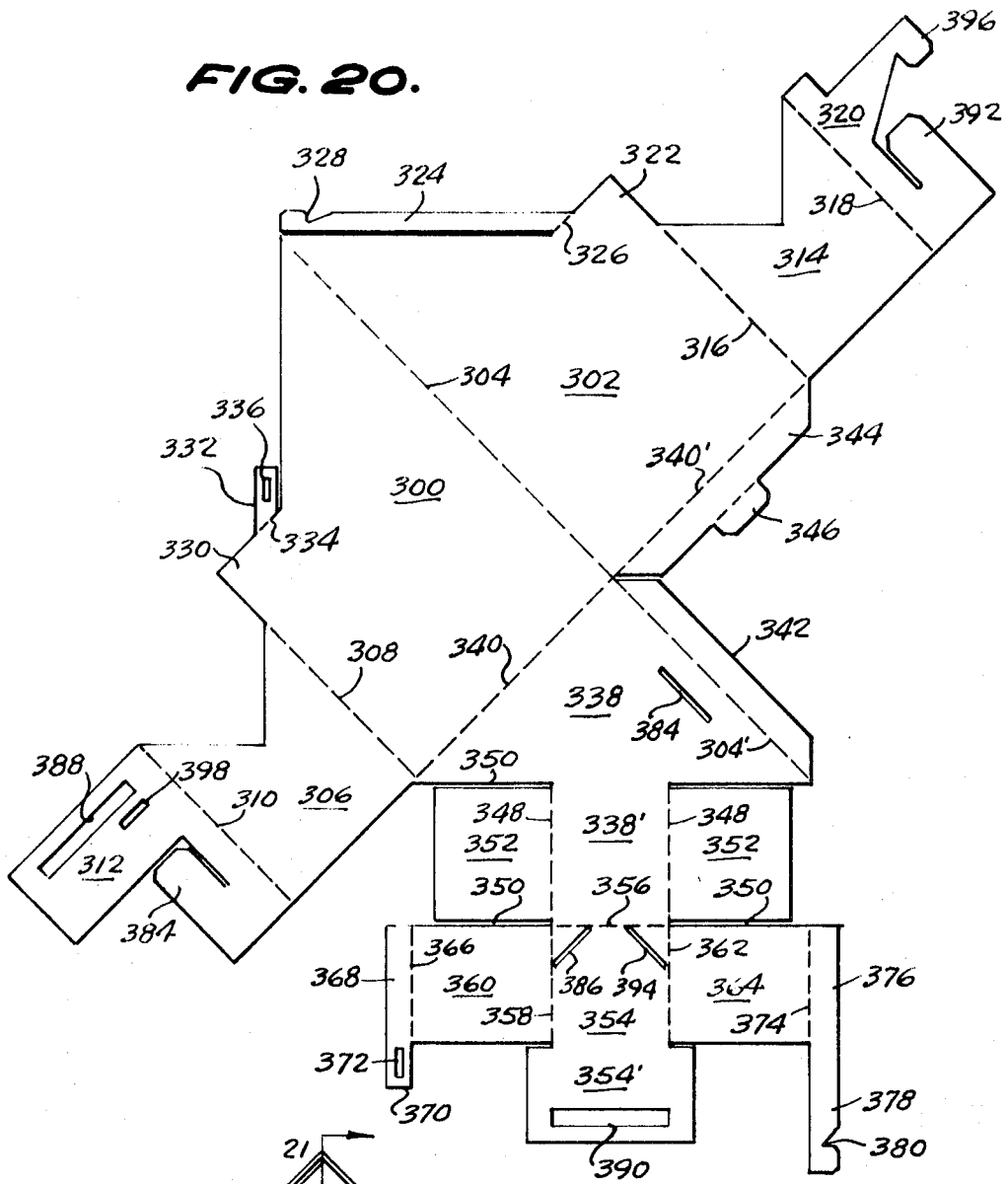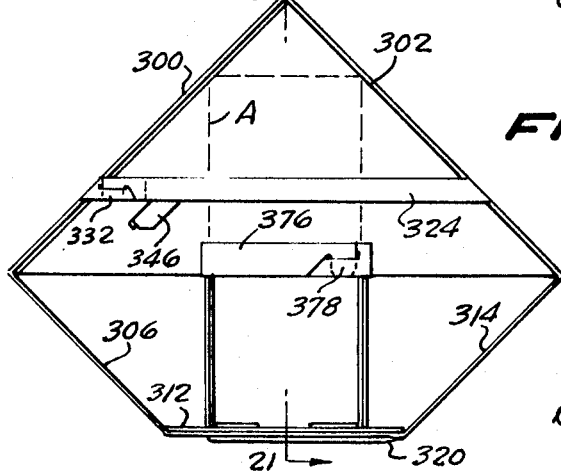

INVENTOR.
JULIUS C. TUCCI,
BY
Berman, Davidson & Berman,
ATTORNEYS.

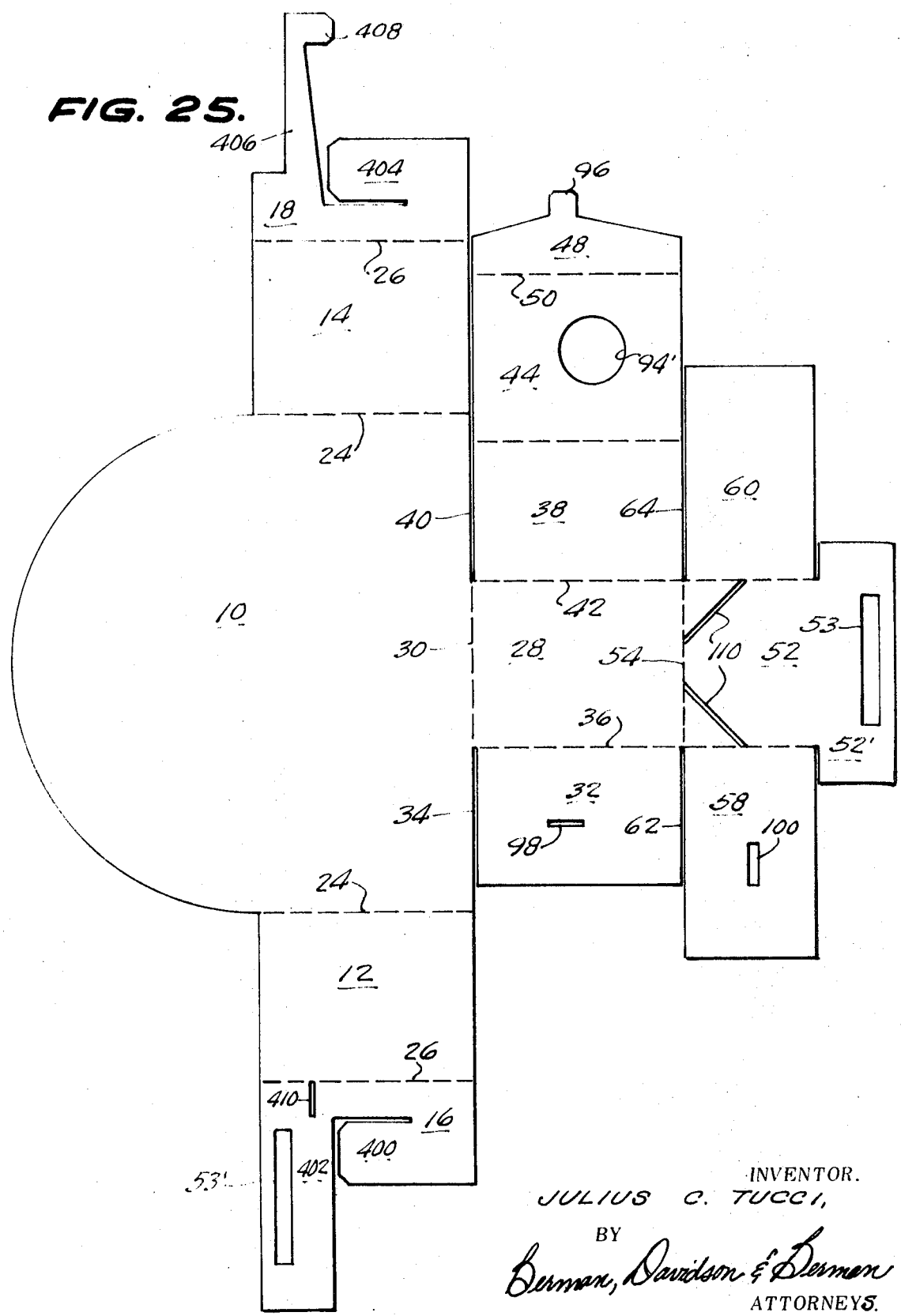

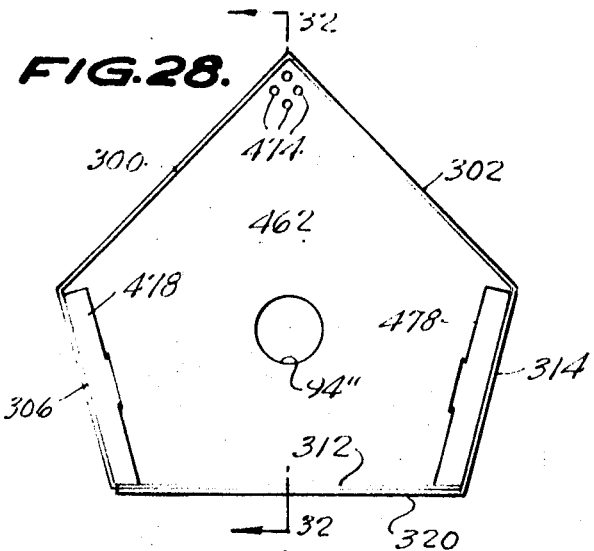
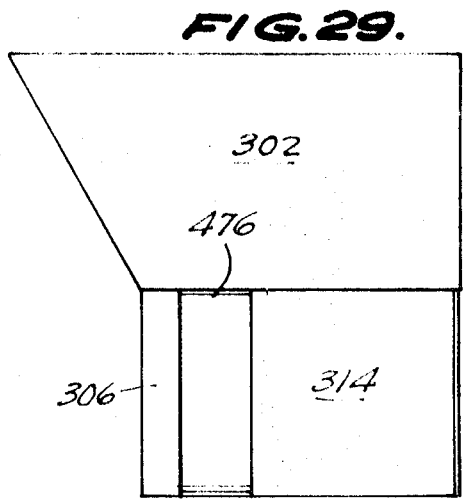
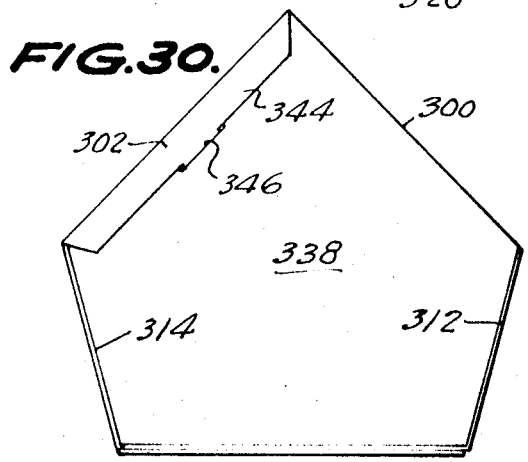
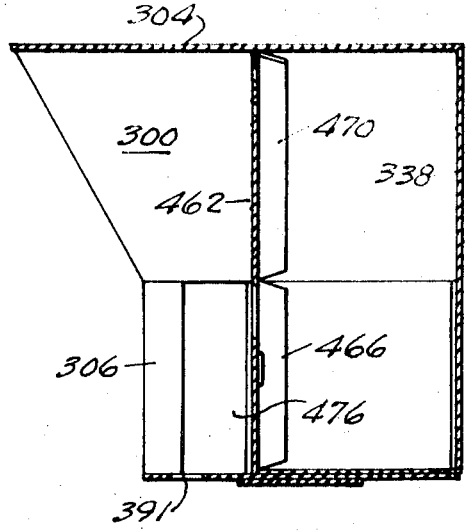
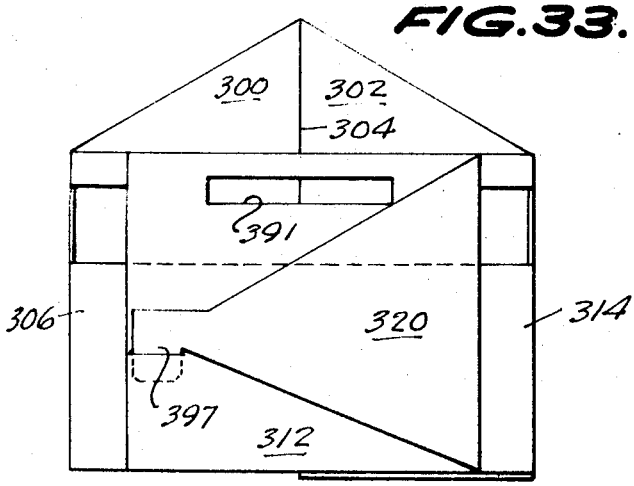

COLLAPSIBLE COMBINATION BIRD SHELTER AND FEEDER

This invention represents an improvement upon the several structures disclosed in my prior patent 3,425,602, dated Feb. 4, 1969, to which reference may be had so far as necessary to complete this present disclosure.

It is an object of this invention to provide a combined bird feeding or housing station and bird shelter which may be formed in the flat from a sheet or cardboard, plastic or the like. It is important that such a combination structure be capable of being shipped in the flat, that it be erectable by simple folding, and that it be locked in erected condition firmly, but without resort to staples or adhesives.

In the nature of things, a structure such as here contemplated must be exposed to the weather for considerable periods of time. It must be, therefore, water-resistant and the assembly must be sufficiently secure to withstand severe rain and wind conditions. When a feeding station is embodied, the design must be such that the supply of bird seed periodically may be replenished with a maximum disassembly in order to give access to the feed magazine.

It is to be doubted that the appearance of such a structure matters greatly to the birds. The birds, however, do not buy structures and a generally attractive appearance therefore is an extremely important feature.

The above and other objects and requirements and the manner in which they are achieved and met will become apparent from the following detailed description taken in connection with the annexed drawings, in which:

FIG. 1 is a perspective view of a preferred form of combined bird shelter and feeding station;

FIG. 2 is a flat plan view of a blank from which the structure of FIG. 1 is formed;

FIG. 6 is a perspective view of a structure somewhat similar to FIG. 1, but formed from two blanks;

FIG. 7 is a flat perspective view of a blank cut and scored to form most of the structure of FIG. 6;

FIG. 8 is a flat plan view of an auxiliary blank cut and scored to form a vital part of the feeding station;

FIG. 9 is a perspective view of the blank of FIG. 8 folded and ready for insertion into the structure of FIG. 6;

FIG. 19 is a front elevation of a structural modification of the form illustrated in FIGS. 13-18, but which employs the feeder station of FIGS. 15 and 16;

FIG. 20 is a flat plan view of the blank cut and scored to form the shelter of FIG. 19;

FIG. 25 is a flattened plan view of the blank from which the structures of FIGS. 23 and 24 are formed;

FIG. 28 is a front elevation of a further form of combined shelter, bird house with perch and porch;

FIG. 29 is a side elevation of FIG. 28;

FIG. 30 is a rear elevation of FIG. 28;

FIG. 32 is a section on the line 32—32 of FIG. 28; and

FIG. 33 is a bottom plan view of FIG. 28.

Figure 3:
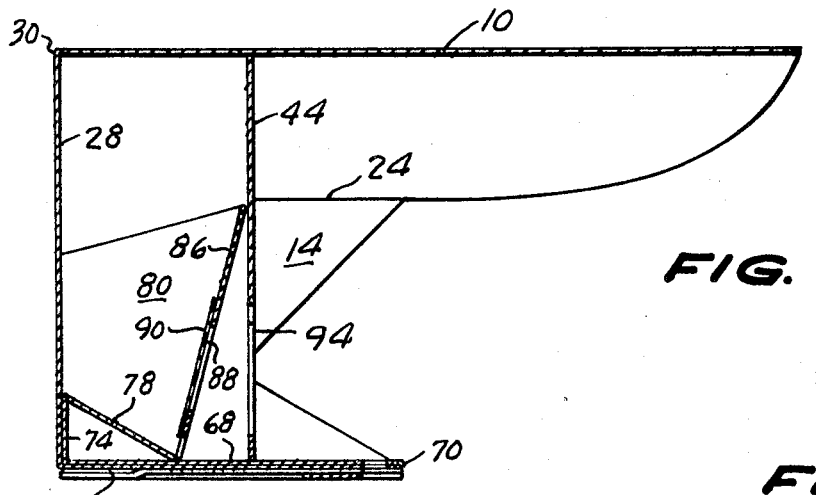
FIG. 3 is a section on the line 3—3 of FIG. 1.
Figure 4:
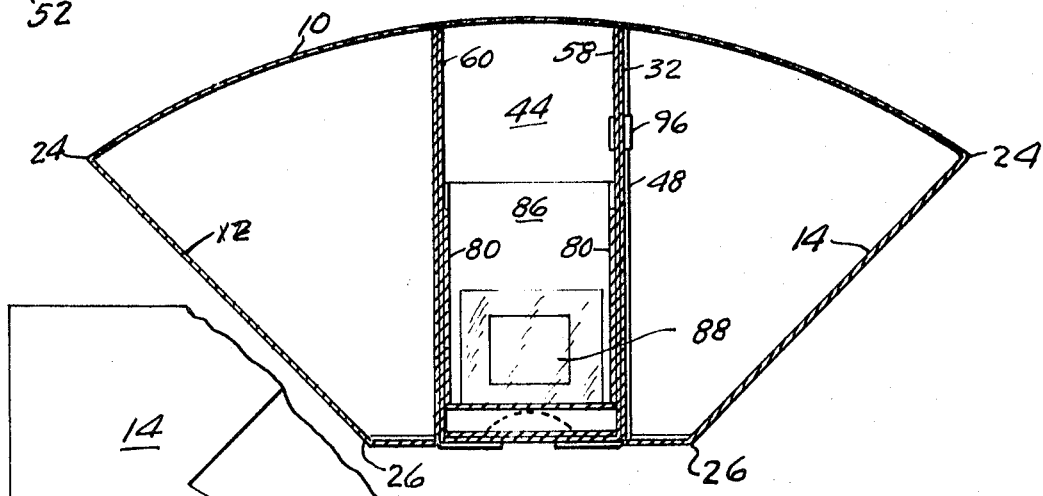
FIG. 4 is a section on the line 4—4 of FIG. 1.
Figure 5:
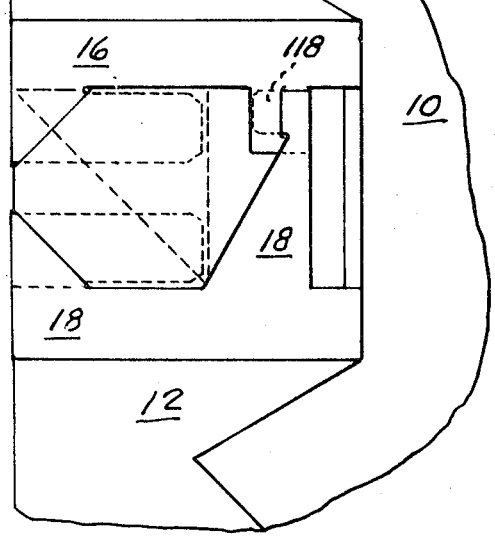
FIG. 5 is a bottom plan view of FIG. 1.

Referring now to FIGS. 1 and 2, there is shown a roof portion 10, shelter side walls 12 and 14. The sidewall 12 carries a bottom closure flap 16 while the sidewall 14 carries a mating closure flap 18.

As seen in FIG. 1, the construction provides a feeding perch generally designated 20 and a feed distributor and magazine or hopper and trough generally designated 22.

Referring now to FIG. 2, it will be noted that score lines 24 provide lines of definition between roof portion 10 and sidewall panels 12 and 14. Similarly, score lines 26 define the bottom closure flaps 16 and 18 respectively from the sidewalls 12 and 14.

The feeder station 22 has a backwall 28, defined from the roof 10 by a score line 30. An outer feeder sidewall 32 is defined from the roof 10 by a slot 34 and from the feeder backwall 28 by a score line 36. A generally similar outer sidewall 38 is defined from the roof 10 by a slot 40 and from the rear wall by a score line 42.

A feeder front wall 44 is defined from the top 10 by a prolongation of the slot 40 and from the outer sidewall 38 by a score line 46. A side closure panel 48 is defined from the roof 10 and the sidewall 14 by prolongation of the slot 40 and is defined from the front feeder wall 44 by a score line 50.

A combination bottom floor and porch panel 52 is defined from the rear feeder backwall 28 by a score line 54 and by score lines 56 from inner feeder or hopper side panels 58 and 60. The inner sidewall 58 is defined from the outer sidewall 32 by a slot 62 while the inner hopper side panel 60 is defined from the outer sidewall 38 by a slot 64 which also defined from the outer sidewall 38 by a slot 64 which also defines the inner side flap 60 from the front wall 44 and from side closure panel 38.

The panel 52 has a widened porch or perch forming section 52' defined from inner side walls 58 and 60 by slots 66 and from a broadened portion 68' of a similar and mating panel 68 by a score line 70. The other end of the panel 68 is defined by a score line 72 to define an auxiliary panel 74. The auxiliary panel 74 itself further is defined by a score line 76 from a feed regulator panel 78. Panels 52' and 68' each contain mutually identical slots 53 and 67 respectively.

A score line 84 offsets a feed dispensing wall 86 which contains a slight opening 88 which is covered by a transparent plastic window patch 90 marginally adhered to the panel 86. Along the score line 84 panel 86 is provided with an arcuate dispensing opening 92. Score lines 82 serve to define feeder side flaps 80.

To minimize shipping space, the blank of FIG. 2 is folded upon itself along the score line 54 which defines the bottom edge of rear wall 28. The various parts have been proportioned so that upon such folding of the free edge of panel 86 coincides with the center of the free edge of the top 10. The outer shelter sidewalls 12 and 14 are then folded inwardly to overlie the already folded portion of the feeder station.

When it is desired to unpack and set up a shelter-feeder, the flaps 12 and 14 are folded out to the position shown in FIG. 2. In fact, it will usually be most efficient to restore the blank to fully open condition of FIG. 2.

With the blank once again in the position of FIG. 2, the first step is to fold the blank along the line 70 to bring the panel 68 fully superimposed on the panel 52 with the slots 53 and 67 in registry. Panels 80 are then folded on the lines 82 to bring panels 80 normal to the plane of the panels 52 and 68. Before this can be accomplished, however, it is necessary to fold the panel 74 on the line 72 until it lies normal to the rear panel 28. The panel 78 is then folded along the score line 84 so as to lie in a plane inclined to that of the panel 74. The feeder regulator panel 86 then is folded along the line 84 while the panels 80 are folded along the lines 82. This brings the panel 86 into inclined relationship to the superimposed bottom panels 68 and 52.

The panels 58 and 60 are then folded along the score lines 56 so as to be normal to the panel 52 and thereby constitute inner feed sidewalls. The backwall 28 is then folded upwardly on the score line 54 so as to bring score lines 36 and 42 into registry to the inner margins of inner sidewalls 58 and 60.

Panel 52 is then folded on the line 36 so as to overlie the panel 58. Thereafter, panel 38 is folded on the score line 42 so as to overlie the inner sidewall 60. The front panel 44 is then folded to overlie the panel 52 and to constitute a front wall.

The panel 44 is provided with an access opening 94 which, as best seen in FIG. 3, registers with the opening 88 in the panel 86. The side closure flap 48 has a projecting locking tongue 96, and when the flap 48 is folded on the line 50 to overlie side panels 32 and 58, the tongue 96 enters a narrow slot 98 in the panel 32 and thereafter enters a somewhat larger slot 100 in the panel 58. The feeder section is now complete and self-sustaining.

The roof 10 is then folded on the line 30 so as to overlie the open top of the feeder magazine 22 and the sidewalls 12 and 14 are then folded downwardly on the score lines 24.

The bottom locking panel 16 is provided with a tongue 102 defined by a slot 104. In alignment with and spaced from the tongue 102 is a projecting tab 106 having a slot 108. It will be noted in FIG. 2 that the panel 52 between score lines 54 and 56 is provided with a pair of diagonal slots 110. When the panel 16 is folded on the line 26 so as to overlie the panel 52, the tongue 102 enters one of the slots 110 in the panel 52 with the projection 106 simply overlying the panel 52.

The opposite bottom closure panel 18 has a tongue 112 defined by a slot 114 that is precisely similar to tongue 102 on the flap 16. In place of the tab 106, however, the flap 118 is provided with a triangular projecting portion 116 terminating in a tab 118. As final steps, the panel 14 is folded on the line 24 until the fold line 26 coincides with the bottom of the previously established feeder station. Closure panel 18 is then folded across the panel 52 along the line 26 and the tongue 112 is inserted in the remaining diagonal slot 110, after which the tongue 118 is inserted in locking engagement into the slot 108 in the locking tab 106. The entire structure is now fully erected and solidly maintained.

When it is desired to replenish the bird seed in the magazine it is only necessary to disengage the closure flaps 16 and 18 by reverse procedure and to lift the top 10 on the full line 30 in order fully to expose the interior of the magazine, after which the flaps 12, 14, 16 and 18 are restored to their original locked condition.

The form illustrated in perspective in FIG. 6 represents an attempt to reduce the consumption of board essentially by making the blank of FIG. 2 in two pieces and thereby eliminating certain minor panels as well as sharply reducing the total area of board to be cut. It should be emphasized that both as to the blank of FIG. 2 and the blanks involved in the hereinafter to be described forms, the precise profiling of the upper portions of the panels 12 and 14 of FIG. 2 (these being those edges remote from the slots 34 and 40) is entirely a matter of esthetics. In FIG. 2, the panels 12 and 14 are given a V-shaped indentation while in FIG. 7 the equivalent panels are rectangular. They could quite as easily be given triangular projections rather than indentation or, for that matter, they could be scalloped and/or arcuate either as projections or indentations. In no case, would total board consumption be affected.

Figure 10:
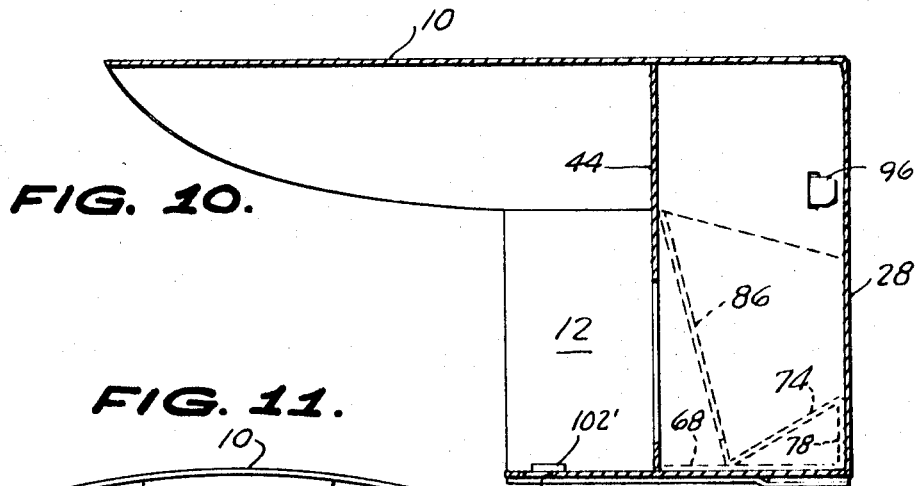
FIG. 10 is a section on the line 10—10 of FIG. 6.
Figure 11:
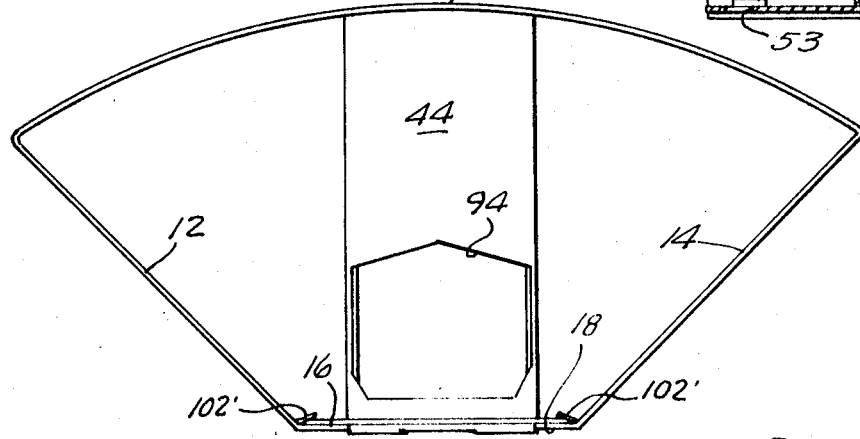
FIG. 11 is a front elevation of FIG. 6.
Figure 12:
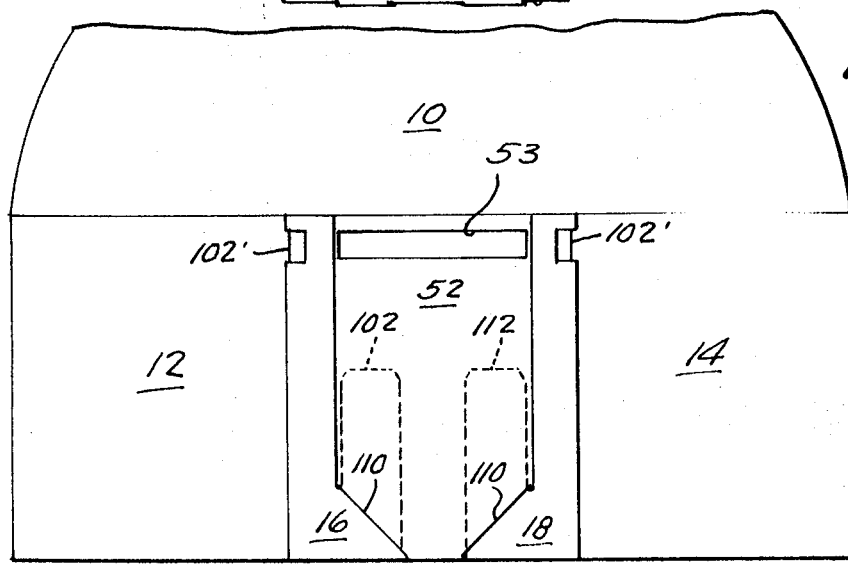
FIG. 12 is a bottom plan view of the structure of FIG. 11.

Referring now to FIGS. 6, 7, 8 and 9, in which the same parts are given the same reference numerals as in FIG. 2, it will be noted that the panel 68' is omitted and the group of panels 68, 74, 78, 86 and 80 are made as a separate blank, shown in FIG. 8, and preliminarily assembled to the form shown in FIG. 9. When thus assembled, the blank is placed so that panel 68 is superimposed on the panel 52 of FIG. 7. The remaining folding and interlocking steps are carried out precisely as in the case of the blank of FIG. 2. Closure flaps 16 and 18 each has a bendable tongue 102' formed along score lines 26. As best seen in FIGS. 10–12, these are bent to overlie the panel 52'.

Figure 14:
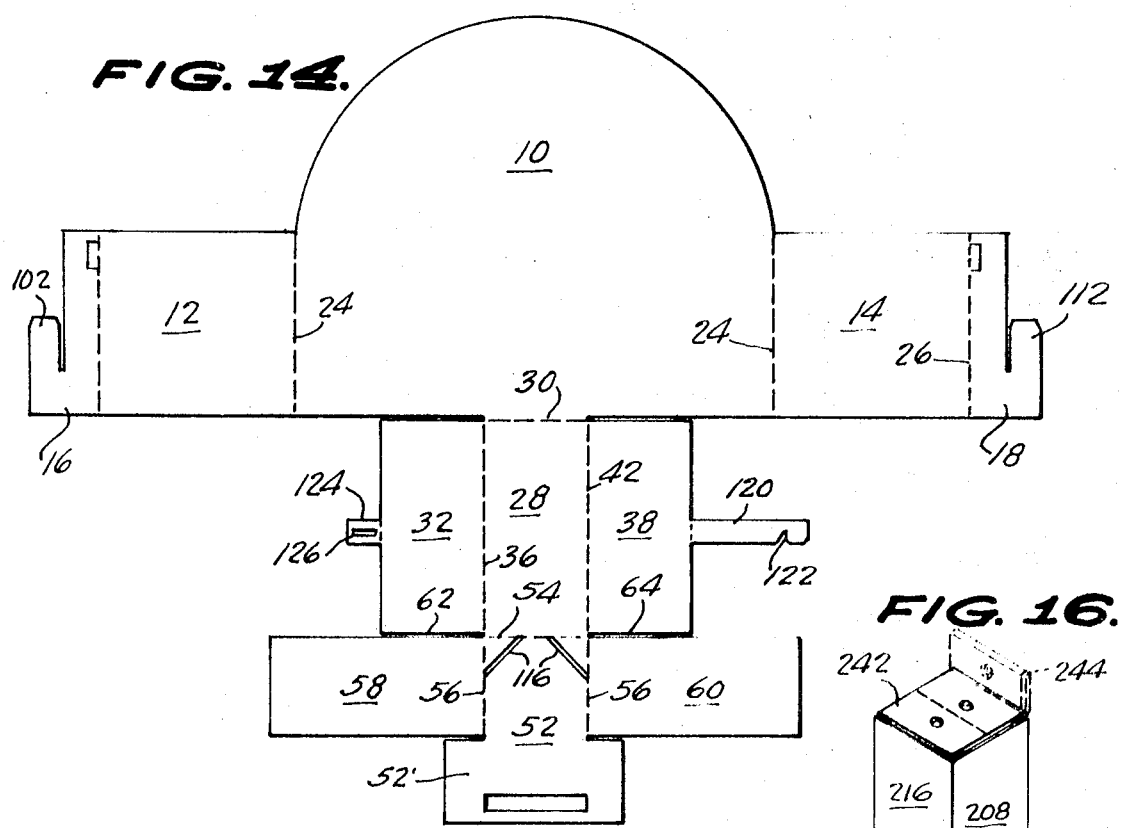
FIG. 14 is a flat plan view of a blank forming the shelter portion of the complete structure.
Figure 13:
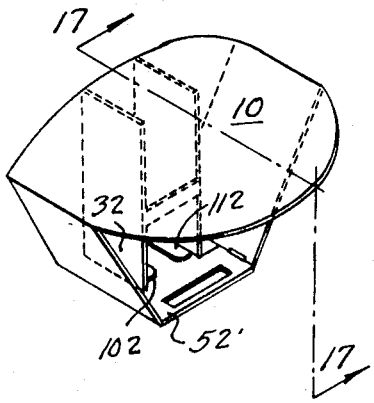
FIG. 13 is a perspective view of a fully erected and assembled form of shelter generally similar to FIG. 6, for reception of a different design of the feeder station.
Figure 17:
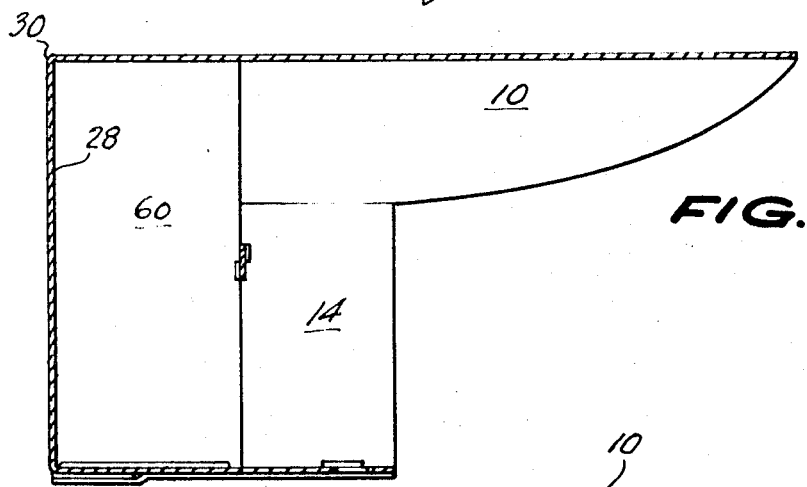
FIG. 17 is a section on the line 17—17 of FIG. 13.
Figure 18:
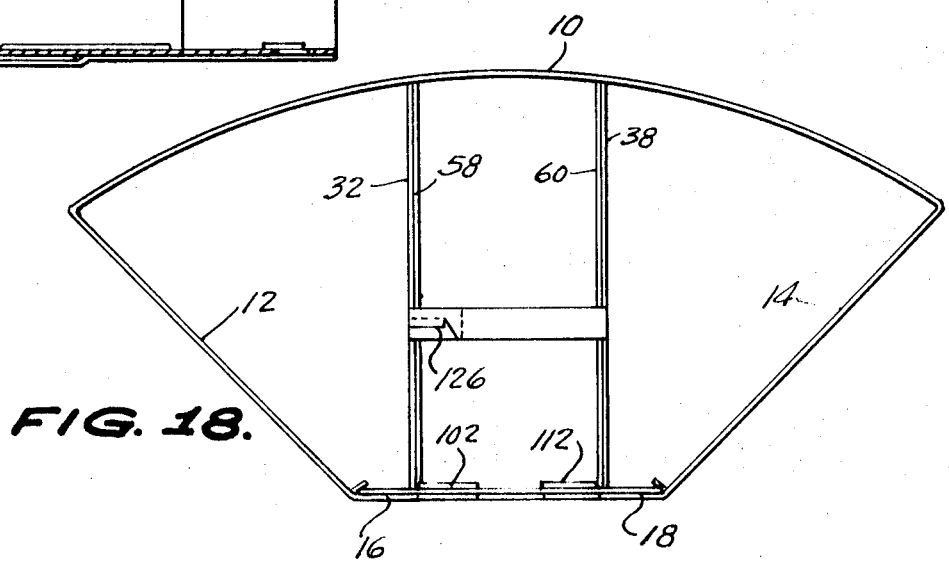
FIG. 18 is a front elevation of FIG. 15.

FIG. 13 is a perspective view of a fully erected bird shelter before insertion of the feeding unit. This shelter is formed from the blank shown in FIG. 14. The feeding unit is of separate and independent utility shown in perspective in FIG. 16 and is formed from the blank shown in FIG. 15. The blank of FIG. 14 is identical to the blank of FIG. 7 except that panels 44 and 48 are omitted and midway to the sidewall panel 38, there is provided a tongue 120 having adjacent its free end a notch 122. On the panel 32 there is formed a tongue 124 having a slot 126. When fully erected, as shown in FIG. 13, the tongues 120 and 124 are folded and interlocked to secure the unit of FIG. 16 in place.

Figure 16:
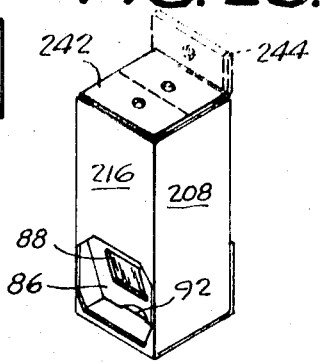
FIG. 16 is a perspective view of the blank of FIG. 15 fully erected.
Figure 15:
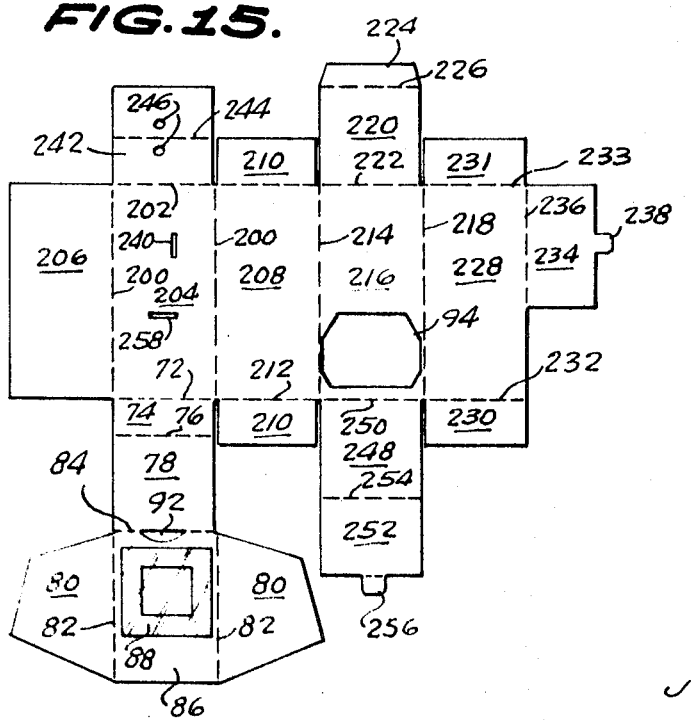
FIG. 15 is a flat plan view of a blank forming the feeding station.

Referring now to FIGS. 15 and 16 (which correspond respectively to FIGS. 14 and 12 of U.S. Pat. No. 3,425,602) and particularly FIG. 15, panels 74, 78, 80 and 86, as well as score lines 72, 74, 84 and 82 are identical with those shown in FIGS. 2 and 8. The remainder of the blank, however, is quite different. A rear wall 204 is defined by score lines 72, 200 and 202. A side panel 206 is defined by the left hand score line 200. A second side panel 208 is defined by another score line 200 and has, at top and bottom, partial closure tabs 210 defined by score lines 212. At the right the panel 208 is defined by a score line 214. A front panel 216 is defined by the line 214 and a parallel score line 218. The panel 216 has a top closure flap 220 defined by a score line 222 and terminating in a tuck-in flap 224 defined by a score line 226. An access opening 94 is provided, as in the case of pane 44 of FIG. 2. An outer sidewall 228 is defined by the score line 218 and has at one end a partial closure flap 230 defined by a score line 232, and at the other end a similar flap 231 defined by a score line 233. Projecting from about the upper half of the panel 228 is a rear closure flap 234 defined by a score line 236 and having a locking tab 238 which ultimately engages a slot 240 in the rear wall 204.

The rear wall 204 has a hanging flap 242 defined by the score line 202 and flap 242 has a median score line 244 with apertures 246 on opposite sides of the score line 244.

To set up the feeding unit, panel 74 is folded along the lines 72 into superimposed relationship to the back panel 204, with the panels 78, 86 and 80 in the condition shown in FIG. 9. The flaps 210 and 230 are then folded respectively along score lines 212 and 232 so as to lie normal to the panels 208 and 228. Panel 216 then folds across the structure to form a front wall. The sidewall 228 then is brought into the position overlying the panel 206. The closure flap 234 is then folded against the rear panel 204 and the tab 238 is brought into locking engagement with the slot 240.

A bottom closure is formed by a panel 248, defined from panel 216 by a score line 250 and is folded on the line 250 to overlie the partial closure flaps 210 and 230. A rear locking flap 252 is defined from bottom closure 248 by a score line 254 and carries a central tab 256. The closure panel 252 is folded against the rear wall 204 and the tab 256 is engaged in a slot 258 in the rear wall 204. The upper flap 210 is folded into the plane of the top. The panel 220 is folded to overlie panel 210 and the tuck-in flap 224 is fed in against the rear inside of rear panel 204. This is done after a charge of bird seed has been put in the package.

The flap 242 with its score line 244 and perforations 246 is an optional feature. If it is desired to use the feeder apart from the shelter, the flap 242 is folded along the line 244 to bring perforation 246 in registry and thus provide a means for receiving a suspension hook which will let the feeder be hung from a wall or similar structure.

Figure 21:
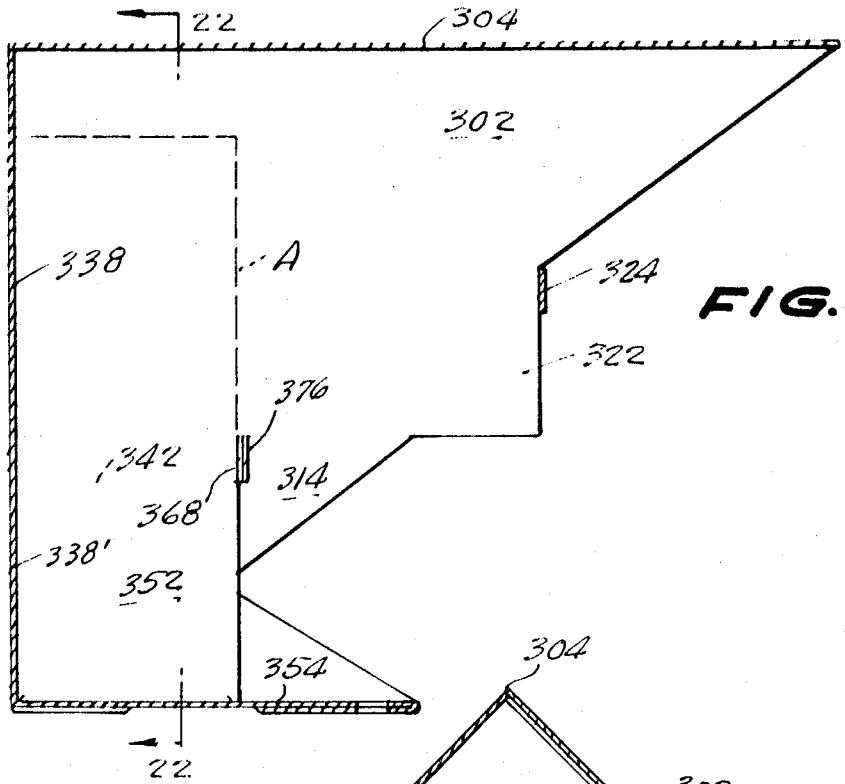
FIG. 21 is a section on the line 21—21 of FIG. 19.
Figure 22:
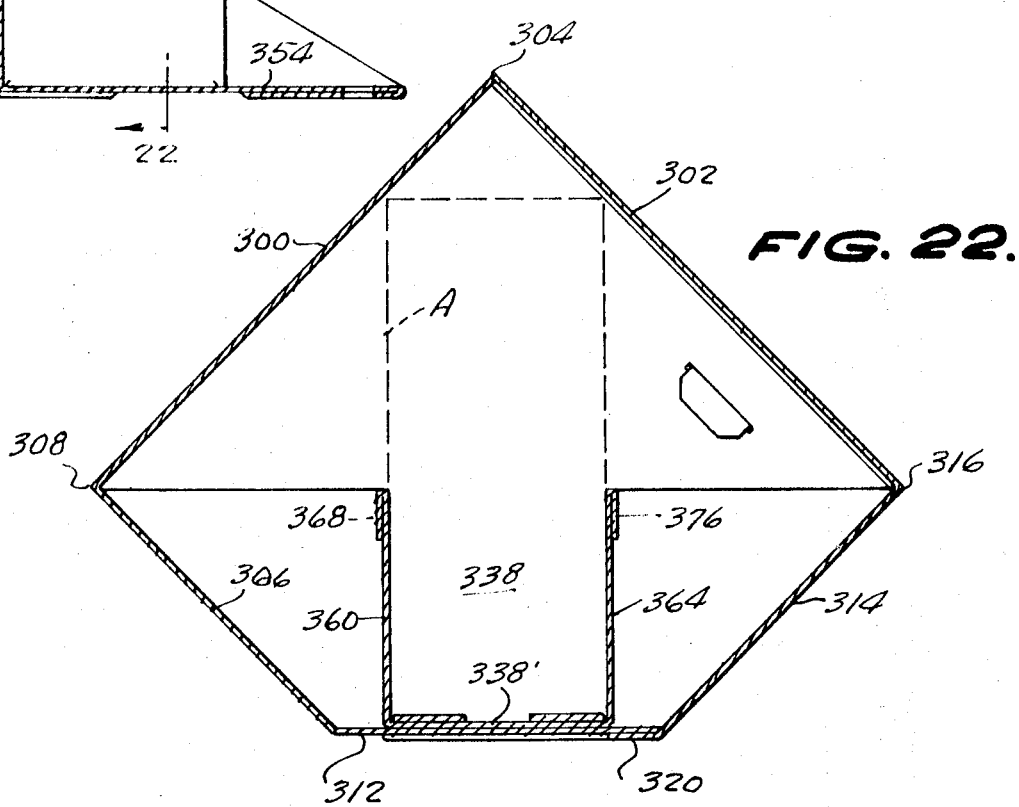
FIG. 22 is a section on the line 22—22 of FIG. 21.

The feeder unit shown in FIGS. 15 and 16 also may be used unchanged with the shelter structure shown in FIGS. 20–22 which will now be described.

This is a peaked roof structure, seen in front elevation in FIG. 19, with the feeder unit of FIG. 16 indicated in dotted outline and designated A. A shelter is formed from a one-piece blank, shown in flattened plan view in FIG. 20. The roof comprises panels 300 and 302 divided by a medial score line 304. A sidewall panel 306 is defined from the panel 300 by a score line 308 while a second score line 310 defines a bottom closure panel 312. A second sidewall panel 314 is defined from roof panel 302 by a score line 316, while another score line 318 defines a bottom closure panel 320.

The roof panel 302 has a projecting triangular portion 322 from which projects a tongue 324 defined at its base by a score line 326 and having adjacent its free end a locking tongue 328.

The roof panel 300 has a similar triangular projection 330 and from this extends a tongue 332 defined at its base by a score line 334 and having adjacent its free end an open slot 336.

A rear wall panel 338 is defined from the top panel 300 by a score line 340 and has a score line 304' forming a prolongation of the medial roof score line 304 to define a tongue 342. A prolongation 340' of the score line 340 defines a locking flap 344 having a projecting tab 346. A narrow portion 338' of the rear wall 338 is defined by score lines 348 which with slots 350 define exterior sidewall flaps 352.

A bottom panel 354 is defined from the portion 338' by a score line 356 and has a broadened "porch" portion 354'. A score line 358 defines an inner side panel 360, while a score line 362 defines an inner side panel 364. A score line 366 in the inner side panel 360 defines a trim flap 368 which terminates in a free tongue 370 having adjacent its free end a slot 372. In the panel 364 a score line 374 defines a trim flap 376 which terminates in a free tongue 378 having adjacent its free end a locking notch 380.

When it is desired to set up the entire structure, inner side panels 360 and 364 are folded respectively along the score lines 358 and 362 so as to be normal to the bottom panel 354. The resultant structure is then folded along the score line 356 to bring to panels 354 and 338' at right angles, one to the other. The outer side flaps 352 are then folded on the lines 348 so as to be normal to the panel 338' and to overlie the panels 360 and 364. The flaps 368 and 376 are then folded outwardly respectively along the score lines 366 and 374 so as to overlie the upper margin of the panels 352. It is at this stage that a feeding unit such as is illustrated in FIGS. 15 and 16 is inserted into the pocket defined by panels 354, 388' and the several side panels. Once the feeding unit is in place, as indicated at A in FIG. 19, the tongues 370 and 378 are folded across the front of the feeder with the notch 380 engaged in the slot 372 not only to prevent dislodgment of the feeder unit A but also to tie the side wall structures together.

AT the conclusion of the previously described folding steps, panels 306, 300, 302 and 314 are still in the plane of the back panel 338. The next step is to fold inwardly the flap 342 along the score line 304', after which the panel 300 is folded on the score line 340 to lie in a plane at right angles to the plane of the back panel 338. The top panel 302 is then folded along the line 304 to bring the score line 304 into coincidence with the score line 304'. The flap 344 is then folded on the line 340' and the tongue 346 of the flap 344 is inserted into a slot 384 formed in the back panel 338, thus securing the roof structure of panels 300 and 302.

Sidewall 306 is then folded inwardly along the score line 308 and bottom closure panel 312 is folded inwardly along the score line 310. During such folding of the bottom panel 312, the tongue 384 is inserted into a diagonal slot 386 formed in the bottom panel 354. This secures the panel 312 and brings a slot 38 into registry with the slot 390 formed in the porch portion 354'. The registering slots 388 and 390 define a perch.

The outermost sidewall 314 is then folded inwardly along the score line 316 and the bottom closure flap 320 is then folded inwardly along the score line 318. This brings a tongue 392 on the bottom flap 320 into engagement with a diagonal slot 386 formed in the bottom panel 354. The tab 396 formed on the bottom panel 320 is then brought into engagement with a slot 398 formed in the opposite bottom closure panel 312 to complete closure of the bottom.

As best seen in FIG. 19, the elongated flap 324 projecting from the triangular portion 322 of the panel 302 is then folded across the front of the shelter and brought into engagement with the slot 336 of the opposite tongue 332. The combined shelter and bird feeding station is now complete.

FIGS. 23-27 show an adaptation of the blank of FIG. 7 to the formation of a combination bird house and bird shelter. So far as equivalent panels, tongues, etc. are concerned, FIGS. 23-27 will use the same reference numerals that occur in FIGS. 6-12.

Figure 23:
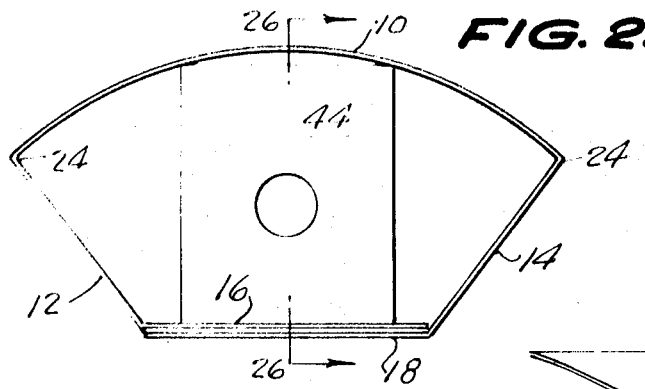
FIG. 23 is a structure combining the shelter, the perch and an actual bird house rather than a feeding station.
Figure 24:
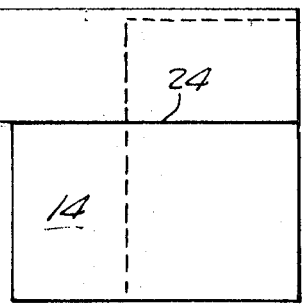
FIG. 24 is a side elevation of FIG. 23.
Figure 26:
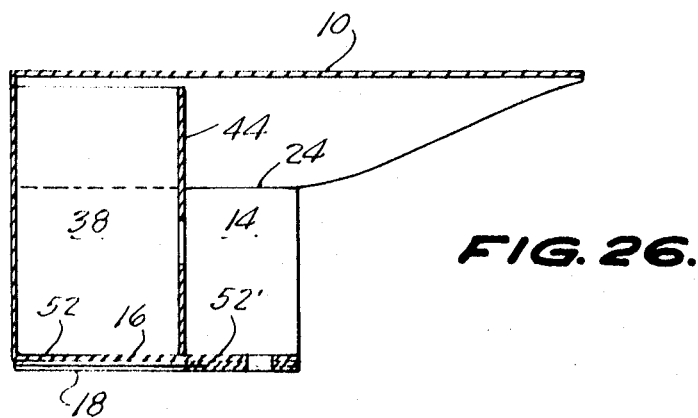
FIG. 26 is a section on the line 26—26 of FIG. 23.
Figure 27:
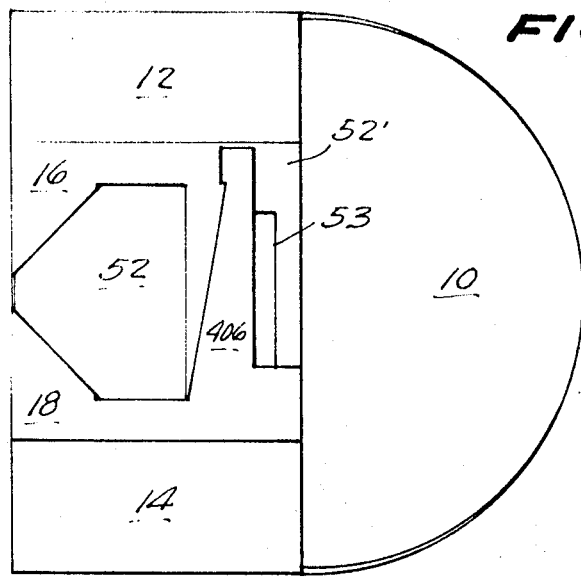
FIG. 27 is a bottom plan view of FIG. 23.

FIG. 25 shows a blank which is erected to form the shelter and house of FIGS. 23 and 24. This is done by first folding inner sidewalls 58 and 60 along the prolongations of score lines 36 and 42 which define them from the floor panel 52. With the flaps 58 and 60 normal to the floor panel 52, the panel 52 is then folded on the score line 54 so as to lie normal to the backwall 28. With the panels 58 and 60 in alignment with the score lines 36 and 42, outer sidewalls 32 and 38 are then folded on the score lines 36 and 42 so as respectively to overlie the panels 58 and 60. The front wall 44 is then folded to lie parallel to the rear wall 28. It will be noted that instead of an inspection opening, the wall 44 here is provided with a bird entrance opening 94'. The bird house proper then is completed by folding the flap 38 to overlie the sidewall 32 with the tongue 96 engaging both the slot 98 in the sidewall 32 and the slot 100 in the inner sidewall 58.

The roof panel then is folded on the line 30, the exterior sidewalls 12 and 14 are then folded downwardly from the roof panel 10 and the bottom closure panels 16 and 18 are then folded to underlie the floor panel 52. The flap 16 is folded and it is provided with a locking tongue 400 which enters the leftward diagonal slot 110, as seen in FIG. 25. At the opposite side of the flap 16 is a projection 402 which contains a cutout slot 53'. When the flap 16 is in bottom closure position, the slot 53' underlies and registers with the slot 53 in the broadened portion 52' of the floor panel 52.

The bottom panel 18 is provided with a locking tongue 404, which, when the bottom flap is in closure position, enters the right-hand diagonal slot 110 of FIG. 25. The flap 18 also is provided with a projection 406 having a lock tab 408 at its free end. This enters a slot 410 formed in the portion 402 of the bottom closure flap 16. The structure is now complete.

There remains to be described the form illustrated in FIGS. 28-33 which will be seen to correspond quite closely with the form previously discussed in connection with FIGS. 19-22. So far as possible, the panels, score lines, flaps and tongues have been given the same reference numerals as appear in those figures.

Figure 31:
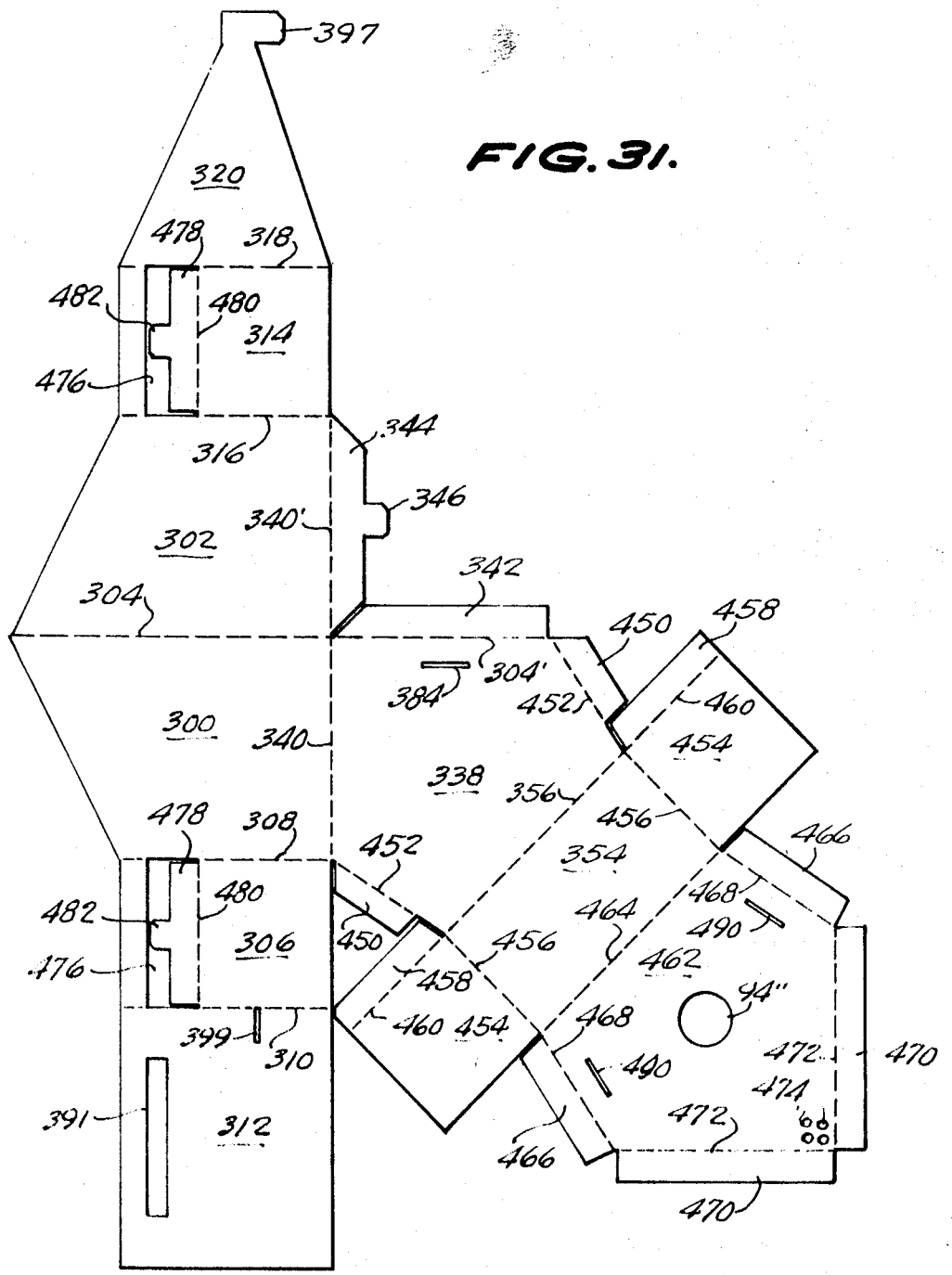
FIG. 31 is a flattened plan view of the blank from which the structure of FIGS. 28-30 is formed.

Referring now to the blank shown in FIG. 31, there are shown the roof panels 300 and 302 divided by score line 304, side panels 306 and 314 defined respectively by score lines 310 and 318. All of these are the same as in FIG. 20. The backwall panel 338 and the bottom panel 354 also are the same as in FIG. 20. Back panel 308 is defined from roof panel 300 by a score line 340 while roof panel 302 has a flap 344 defined by a score line 340', the flap 344 carrying a locking tab 346. Rear wall panel 338 has a flap 342 defined by a score line 304' which forms a continuation of the medial score line 304. At its opposite edge, the rear wall panel 338 has an additional reinforcing flap 450 defined by a score line 452.

The floor panel 354 is defined from the rear wall panel 338 by a score line 356 and has at its opposite sides inner side wall panels 454 defined by score lines 456. Each of the panels 454 has a locking flap 458 defined by a score line 460.

A front wall 462 is defined from the floor panel 354 by a score line 464 and is of the same geometric outline as the rear wall panel 338. It has, adjacent the inner sidewall panels 454, bracing flaps 466 defined by score lines 468 and, adjacent its remaining sides, are bracing flaps 470 defined by score lines 472. It has a roughly central bird entrance opening 94'' and adjacent its outer apex are formed ventilation perforations 474.

The bottom closure flap 312 has a perch slot 391 and a locking slot 399.

The opposite bottom closing flap 320 tapers outwardly and terminates in a laterally projecting locking tab 397.

In the exterior side wall panel 306 is formed an access opening 476 which in flat condition contains a tongue 478 defined by a score line 480 and having a locking pad 482. The exterior side panel 314 is identical.

Optionally, the roof panels 300 and 302 may be provided with projections 330 and 332 with locking tongues 332 and 324, as shown in FIG. 20.

The blank of FIG. 31 is set up into the final shelter following pretty much what has been described with reference to FIG. 20. The chief difference is that the tongues 478 of exterior sidewall panels 306 and 314 are folded across the front wall panel 462 with their tongues 482 engaging slots 490 in front wall panel 462.

As the foregoing detailed description shows, the basic design is capable of a great many variations. The choice is between single or multiple blanks and will depend largely on the market to which the product is aimed. It is essential that the product be shipped flat and that it can be erected into final form by the ultimate purchaser following reasonably simple directions. Generally speaking, it is believed to be easier for the purchaser to erect the combination shelter and feeding station from a single blank rather than from multiple blanks. The use of multiple blanks, however, frequently permits a very considerable saving in the total board consumed, savings sufficiently great to to have a perceptible effect on the price of which the articles may be sold. The ultimate choice as between single and multiple blanks will depend on consumer acceptance at any particular price level.

While several different forms have been shown and described and while some of these differ markedly in appearance when assembled, it will be noted that certain design factors remain constant through all forms and no doubt a perusal of this specification by one skilled in the art will induce in such a reader ideas for various changes and modifications. It is not intended, therefore, to limit this invention to the precise details disclosed herein.

What is claimed is:

1. A bird shelter formed of a blank of sheet material said blank comprising: a roof forming panel; exterior sidewalls attached to said roof forming panel and defined therefrom by score lines; a bottom forming flap on each sidewall, said flaps being defined therefrom by score lines; a backwall panel adjacent said roof forming panel and defined therefrom by a score line; a floor forming panel defined from said backwall panel by a score line; said bottom forming flaps being proportioned and positioned when assembled to underlie said floor forming panel when the blank is folded on said score lines to form a bird shelter, and securing means formed in each of said bottom flaps for interlocking engagement to hold the bird shelter in erected condition.

2. The blank of claim 1, including a second floor forming panel; a pair of panels forming an extension of said second floor forming panel and a feeder panel forming an extension of the second one of said pair of panels.

3. The blank of claim 1, including inner sidewall panels adjacent said backwall panel and defined therefrom by score lines.

4. The blank of claim 1, including inner interior sidewall panels adjacent a portion of said floor forming panel and defined therefrom by score lines.

5. The blank of claim 3, including a front wall panel adjacent one of said inner sidewall panels and defined therefrom by a score line.

6. The blank of claim 1, including means formed in said floor forming panel for locking engagement with said bottom forming flaps.

7. The blank of claim 3, in which said floor forming panel includes a widened portion projecting beyond said inner sidewall panels.

8. The blank of claim 1, in which said roof forming panel has a medial score line.

9. The blank of claim 8, in which the backwall panel is adjacent only one-half of said roof-forming panel.

10. The blank of claim 9, in which a front wall panel forms an extension of the floor-forming panel and is defined therefrom by a score line.

11. The blank of claim 9, including sidewall panels on each side of said floor forming panel and defined therefrom by score lines.

12. The blank of claim 10, including sidewall panels on each side of said floor forming panel and defined therefrom by score lines.

13. The blank of claim 3, including inner interior sidewall panels adjacent a portion of said floor forming panel and defined therefrom by score lines.

14. The blank of claim 13, including a front wall panel adjacent one of said inner sidewall panels and defined therefrom by a score line.

15. The blank of claim 14, including means formed in said floor forming panel for locking engagement with said bottom forming flaps.

16. The blank of claim 15, in which said floor forming panel includes a widened portion projecting beyond said inner sidewall panels.